Patented Aug. 4, 1931

1,817,748

UNITED STATES PATENT OFFICE

ERIK J. HIRVONEN, OF PONTIAC, MICHIGAN, AND WALLACE W. TUTTLE, DECEASED, LATE OF PUTNAM, CONNECTICUT, BY HENRY A. TUTTLE, ADMINISTRATOR, OF UPTON, MASSACHUSETTS, ASSIGNORS, BY MESNE ASSIGNMENTS, TO BENDIX BRAKE COMPANY, OF SOUTH BEND, INDIANA, A CORPORATION OF ILLINOIS

SUPPORT FOR BRAKE BACKING PLATES

Original application filed April 26, 1923, Serial No. 634,855. Divided and this application filed September 29, 1927. Serial No. 222,898.

This invention relates to brakes and is illustrated as embodied in an internal expanding brake for the front wheel of an automobile. An object of the invention is to provide simple means for mounting the backing plate of the brake on the front wheel spindle, the means preferably being such as to be applicable to cars not originally equipped with front wheel brakes. In one desirable arrangement the backing plate is provided with a support or bracket, preferably a separate stamping secured to the backing plate, which has a lug extending at right angles to the backing plate and perforated to be sleeved over the end of the usual steering arm and to be clamped securely in place by the nut which holds the arm in place on the knuckle.

The above and other objects and features of the invention, including various novel and desirable details of construction, will be apparent from the following description of one illustrative embodiment shown in the accompanying drawings, in which:

Fig. 1 is a partial vertical section through the brake just inside the head of the brake drum, and showing the brake shoes in side elevation; and Fig. 2 is a partial section on the line 2—2 of Fig. 1 showing the manner in which the plate is held by the steering arm of the knuckle.

The present application is a division of application Serial No. 634,855, filed April 26, 1923, now Patent No. 1,647,975, issued November 1, 1927, by Erik J. Hirvonen and Wallace W. Tuttle.

In the arrangement illustrated in the drawings, the brake includes a rotatable drum 10 of any suitable form, within which are arranged the shoes 12 or other friction means of the brake, and at the open side of which is arranged a suitable backing plate or dust cover 14. The present invention relates to the manner of mounting the backing plate 14 on the front wheel knuckle 16 which carries the brake and its associated parts, and which is intended to be swivelled or pivoted in the usual manner at one end of the front axle by means of a king-pin or the like 18.

According to the present invention the backing plate 14 is provided with a support or bracket 20 of general T-shape, preferably a separate stamping secured to the backing plate by fastenings such as bolts 22, and which has a lug or attaching portion 24 turned substantially at right angles to the plane of the backing plate and preferably formed to be sleeved over the end of the steering arm 26 which is seated in the usual manner in a conical socket formed in the knuckle 16. The portion 24 of the support 20 is firmly secured in place by the nut 28 which clamps the steering arm 26 to the knuckle 16. It will be seen that this not only provides a simple mounting for the backing plate but also that the mounting is applicable to the wheels of automobiles not originally equipped with front wheel brakes.

While one illustrative embodiment of the invention has been described in detail, it is not our intention to limit its scope to that particular embodiment or otherwise than by the terms of the appended claims.

2. A brake including a drum and a backing plate at the open side of the drum, in combination with a front wheel knuckle, a separate supporting stamping on the back- Aug. 4, 1931.  W. V. KNOLL  1,817,749
BEATER ENGINE
Filed June 28, 1928
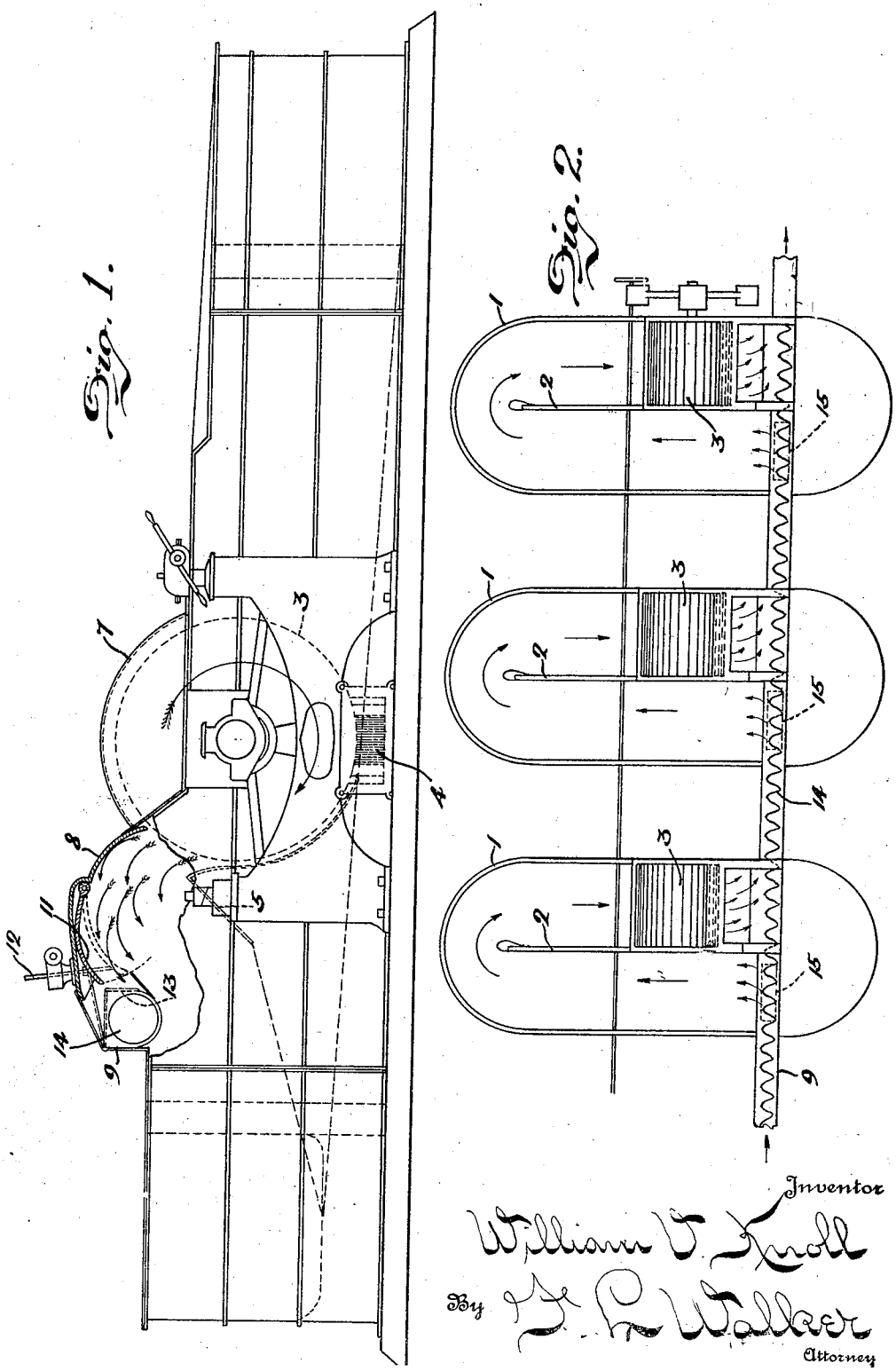

What is claimed is:

1. A brake including a drum with a backing plate at the open side of the drum, the backing plate having an attaching portion in combination with a front wheel knuckle formed with a socket, a steering arm seated in said socket and passing through the attaching portion of the backing plate, and a nut threaded on the end of the steering arm and securing both the backing plate and the steering arm to the knuckle.